United States Patent
Sanderson et al.

(10) Patent No.: US 11,054,400 B2
(45) Date of Patent: Jul. 6, 2021

(54) WING BOX INSPECTION

(71) Applicant: Airbus Operations Limited, Bristol (GB)

(72) Inventors: Timothy Sanderson, Bristol (GB); David Brawley, Bristol (GB)

(73) Assignee: Airbus Operations Limited, Bristol (GB)

( * ) Notice: Subject to any disclaimer, the term of this patent is extended or adjusted under 35 U.S.C. 154(b) by 188 days.

(21) Appl. No.: 16/144,018

(22) Filed: Sep. 27, 2018

(65) Prior Publication Data

US 2019/0094188 A1 Mar. 28, 2019

(30) Foreign Application Priority Data

Sep. 28, 2017 (GB) .................................. 1715692.8

(51) Int. Cl.
*G01N 29/265* (2006.01)
*B64F 5/60* (2017.01)
*B64F 5/40* (2017.01)
*G01N 29/22* (2006.01)
*B64C 3/18* (2006.01)

(52) U.S. Cl.
CPC ............. *G01N 29/265* (2013.01); *B64F 5/40* (2017.01); *B64F 5/60* (2017.01); *G01N 29/225* (2013.01); *B64C 3/18* (2013.01); *G01N 2291/0289* (2013.01); *G01N 2291/2694* (2013.01)

(58) Field of Classification Search
CPC ............... G01N 29/265; G01N 29/225; G01N 2291/0289; G01N 2291/2694; B64F 5/40; B64F 5/60; B64C 3/18; B64C 3/182
See application file for complete search history.

(56) References Cited

U.S. PATENT DOCUMENTS

| | | | |
|---|---|---|---|
| 3,575,043 A * | 4/1971 | Allen | G01N 29/2493 73/619 |
| 5,031,458 A | 7/1991 | Young et al. | |
| 7,249,512 B2 | 7/2007 | Kennedy et al. | |
| 7,698,947 B2 | 4/2010 | Sarr | |
| 9,266,625 B1 | 2/2016 | Troy et al. | |

(Continued)

FOREIGN PATENT DOCUMENTS

| | | |
|---|---|---|
| EP | 2 662 689 | 11/2013 |
| JP | 2003 072691 | 3/2003 |
| WO | 2006/034066 | 3/2006 |

OTHER PUBLICATIONS

Extended Search Report cited in EP 18197327.2 dated Dec. 21, 2018, 8 pages.

(Continued)

*Primary Examiner* — Lisa M Caputo
*Assistant Examiner* — Alex T DeVito
(74) *Attorney, Agent, or Firm* — Nixon & Vanderhye P.C.

(57) ABSTRACT

A method of inspecting a wing box of an aircraft. The wing box includes at least one rib partitioning the wing box in to two bays and at least one stringer attached along an inner surface of the wing box, generally perpendicular to the rib, and extending through an aperture of the rib. The method includes: providing an inspection device on the stringer such that it is movable along the stringer and controlling the inspection device to pass along the stringer, including through the aperture between bays, to perform an inspection of the wing box.

18 Claims, 4 Drawing Sheets

(56) References Cited

U.S. PATENT DOCUMENTS

| | | | |
|---|---|---|---|
| 2004/0161585 A1* | 8/2004 | Gaitonde | B64C 3/26 |
| | | | 428/131 |
| 2006/0043303 A1 | 3/2006 | Safai et al. | |
| 2006/0162456 A1* | 7/2006 | Kennedy | G01N 29/225 |
| | | | 73/620 |
| 2008/0098834 A1 | 5/2008 | Sergoyan et al. | |
| 2013/0333472 A1* | 12/2013 | Georgeson | G01N 29/2418 |
| | | | 73/584 |
| 2014/0188473 A1* | 7/2014 | Lambdin | G06Q 10/08 |
| | | | 704/251 |
| 2014/0224043 A1* | 8/2014 | Tighe | B64C 3/187 |
| | | | 73/865.8 |
| 2016/0288899 A1* | 10/2016 | Dobberfuhl | B64C 3/26 |
| 2017/0133135 A1 | 5/2017 | Hegenbart et al. | |

OTHER PUBLICATIONS

European Search Report cited in EP 18 197 327.2 dated Feb. 20, 2020.

* cited by examiner

WING BOX INSPECTION

RELATED APPLICATION

This application claims priority to United Kingdom Patent Application GB 1715692.8 filed Sep. 28, 2017, the entire contents of each of which is incorporated by reference.

TECHNICAL FIELD

The present invention relates to inspection of a wing box of an aircraft wing.

BACKGROUND

Aircraft wings require regular inspections of the internal wing structure during the lifetime of the aircraft.

Traditional aircraft wings comprise a segmented box structure, called a wing box that is formed from beams called spars, ribs, and stringers, and stiffened skin panels called covers. Further fixed structures are provided beyond the leading and trailing edges of the wing box to create an aerodynamic profile and to support moveable lift devices such as slats on the leading edge and flaps on the trailing edge.

A spar is a structural member of the wing running span-wise at right angles to the fuselage of an aircraft to which the wing is attached. The spar is the main supporting element of the wing which carries flight loads and the weight of the wing on the ground. The sectional profile shape of the wing is maintained by a plurality of ribs, which are connected to the spars. The stringers generally provide out-of-plane stiffness and compressive stability that prevents the wing from buckling as well as supporting the span-wise wing bending loads. Stringers typically run parallel to the spars and pass through the ribs.

Inspections of the wing box are routinely carried out during the lifetime of the aircraft to check for structural issues such as cracks and fissures, loose parts and other signs of damage.

In certain aircraft, access to the wing box is provided through "manholes" in the covers of the aircraft wing. Maintenance personnel can access the inside of the wing box via the manholes to perform inspections. For example, once a manhole has been opened, maintenance personnel can physically access the wing box and inspect the internal structure by eye or can insert an inspection device such as a camera a borescope and/or one or more mirrors, lights or magnifying glasses into the wing box as required. Unfortunately, manholes have a significant impact on the weight of the structure and significantly drive the design of the wing box. In addition, removal and refitting of the manhole covers has a significant impact on the maintenance time of the aircraft. This can increase the costs for completing an inspection. Inspection of the wing box by maintenance personnel physically accessing the wing box can also damage the internal structure. In some cases, manholes are placed in each individual fuel bay. During an inspection maintenance personnel may be required to inspect each such fuel bay individually which is potentially a very time-consuming process.

SUMMARY

A first aspect of the present invention provides a method of inspecting a wing box of an aircraft, the wing box comprising at least one rib partitioning the wing box in to two bays and at least one stringer attached along an inner surface of the wing box, generally perpendicular to the rib, and extending through an aperture of the rib, the method comprising: providing an inspection device on the stringer such that it is movable along the stringer; and controlling the inspection device to pass along the stringer, including through the aperture between bays, to perform an inspection of the wing box.

Optionally, providing the inspection device on the stringer comprises coupling an inspection device to the stringer such that it is movable along the stringer.

Optionally, coupling the inspection device to the stringer comprises coupling the inspection device to a track, which is attached to the stringer, wherein the inspection device is moveable along the track.

Optionally, the method comprises accessing the wing box through a manhole; coupling the inspection device to the stringer; causing the inspection device to travel through the aperture of the rib in one direction; and causing the inspection device to travel through the aperture in the opposite direction to recover the device from the same manhole.

Optionally, the method comprises accessing the wing box through a manhole; coupling the inspection device to the stringer; causing the inspection device to travel through the aperture in one direction; and recovering the device from a manhole located in the wing box on the other side of the rib.

Optionally, the inspection device is attached to a tether.

Optionally, the tether is pushed or pulled to control the motion of the inspection device.

Optionally, the inspection device is at least partially autonomous.

Optionally, the inspection device is arranged to autonomously follow a path along the stringer to perform an inspection.

Optionally, the inspection device is at least partially remotely controllable.

Optionally, the method comprises controlling the inspection device remotely from outside of the wing box.

Optionally, performing an inspection of the wing box comprises receiving data from the inspection device.

Optionally, performing an inspection of the wing box comprises storing and/or analysing data received from the inspection device.

Optionally, inspecting the wing box comprises providing the inspection device on at least one other stringer and controlling the inspection device to pass along the at least one other stringer, to perform an inspection of a region of the wing box other than a region of the wing box visible from the inspection device from the first stringer.

Optionally, the wing box comprises at least a first bay and second bay separated by a boundary rib and wherein performing an inspection of the wing box further comprises providing an inspection device on a stringer in the second bay such that it is movable along the stringer; and controlling the inspection device to pass along the stringer of the second bay to perform an inspection of the wing box.

Optionally, performing an inspection of the wing box further comprises providing an inspection device on a stringer in the second bay.

Optionally, preforming a subsequent inspection of the wing box further comprises comparing data received from the inspection device during one or more previous inspections of the wing box and data received from the inspection device during the subsequent inspection.

Optionally, performing an inspection comprises using a camera, borescope, a laser scanner and/or an X-ray device.

Optionally, the method comprises retrieving the inspection device via a manhole in the wing box

BRIEF DESCRIPTION OF THE DRAWINGS

Embodiments of the invention will now be described, by way of example only, with reference to the accompanying drawings, in which.

DETAILED DESCRIPTION

Figure 1:
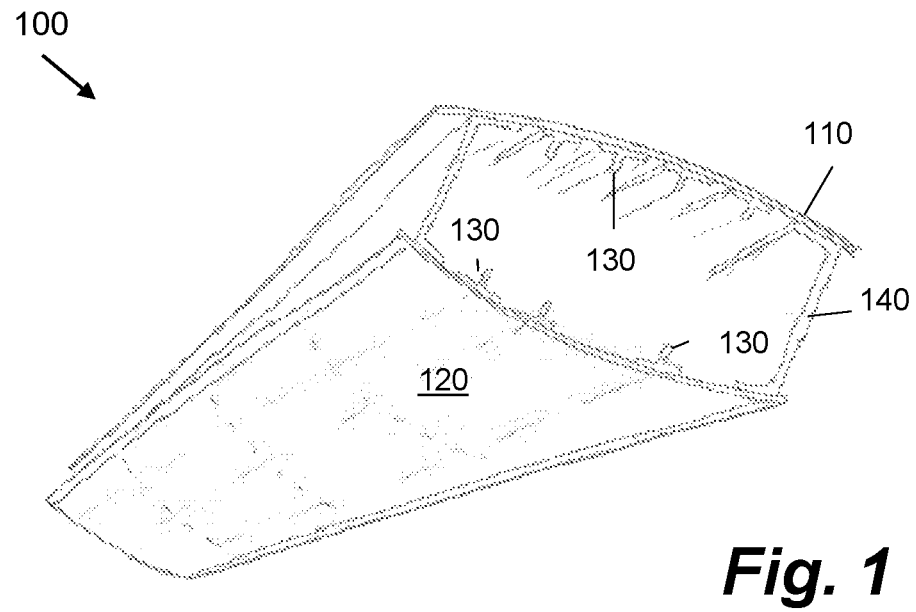
FIG. 1 is a schematic diagram of a wing box of an aircraft wing which may be utilised according to an example.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

In examples described herein, references to "aircraft" include all kinds of aircraft, such as fixed wing, for example military or commercial aircraft, or unmanned aerial vehicles (UAVs).

According to examples described herein, a method of inspecting a wing box of an aircraft is described. The method allows an inspection of the wing box to be carried out without maintenance personnel needing to access the wing box during the inspection unless absolutely necessary. This allows maintenance personnel to carry out an inspection of the aircraft more efficiently. Moreover, the method described herein, when implemented with a suitable inspection device, may be used in aircraft without pre-existing manholes in the wing structure. This allows the weight of the aircraft to be reduced significantly.

There are a number of challenges to address to be able to perform an inspection of an aircraft wing if manholes are not to be used or, indeed, are not present. For instance, ribs are located at periodic intervals down the wing and block ready access along the span of the wing. In modern aircraft, as well as providing structural support, the ribs reduce 'fuel slosh' by restricting the flow of fuel between regions of a fuel bay to relatively small apertures in the ribs.

Any inspection device must be capable of passing between the ribs. However, the apertures are typically very small—of an order of around 10 mm in some instances— and it is difficult to guide inspection devices through the apertures. Moreover, certain regions within the wing box such as the regions located around joining areas are subject to greater levels of wear and tear than other areas. It is therefore preferable to ensure that any inspection device used in accordance with examples described herein can access sufficient areas of the wing box to be able to inspect these areas.

Examples described herein address these challenges by providing an inspection device, which is moveable along stringers that pass through small apertures in the ribs, to move between regions of the fuel bays. In certain examples, the inspection device is a robotic device with one or more inspecting cameras, which can be used to inspect the inside of the wing box. The methods described herein can allow maintenance personnel to inspect the inside of a wing without having to access the wing box through manholes. Examples of the inspection devices described herein are not limited to cameras and may include other imaging devices, 3-D scanners or other inspection technologies. Inspection devices are battery powered or are connected to an external power supply. Some inspection devices may be autonomous or partially autonomous. These devices are programmable to move along a stringer without human control. Other inspection devices may be controllable by a human operator.

According to certain examples described herein, a tether is attached to the inspection device. By attaching a tether to the inspection device, the inspection device can be recovered if one or more components of the inspection device malfunction when the inspection device is in the wing box. In certain examples described herein the tether also provides power to the inspection device. In this case, a much greater lighting power and duration can be used with the inspection device, as compared with an inspection device that is limited by battery power.

FIG. 1 is a schematic diagram showing a wing box 100 of an aircraft wing which may be utilised according to an example. The wing box 100 comprises a cover 110 comprising a skin 120. In FIG. 1, a number of stringers 130 and two spars 140 are shown. The stringers 130 run span-wise, extending in the direction of the wing. In the wing box 100 shown in FIG. 1 the stringers 130 run both on the top side and the lower side of the wing box. In certain cases, stringers may be located on one or both of the top and bottom of the inside of the wing box.

Figure 2:
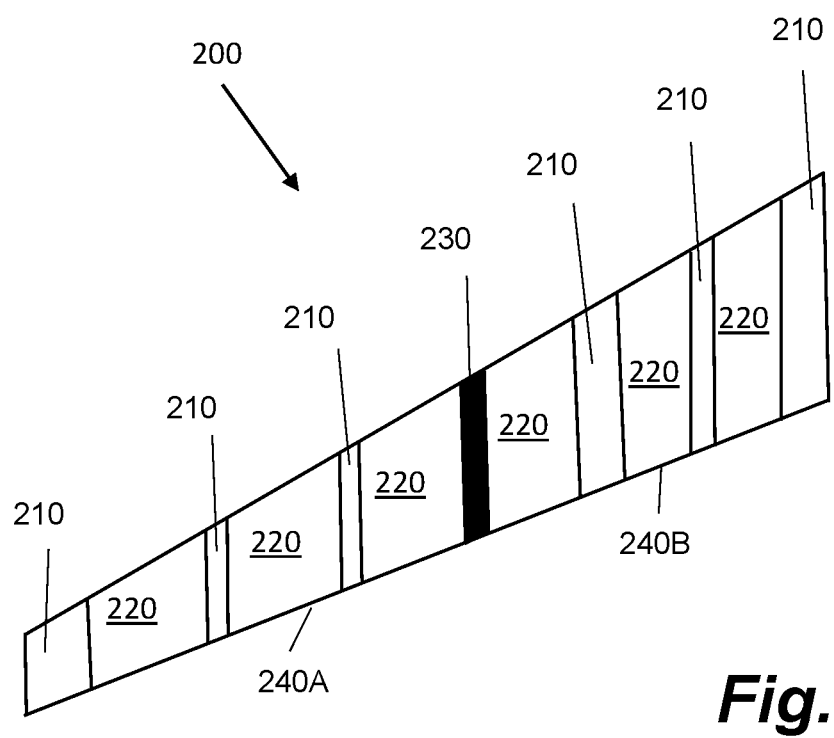
FIG. 2 is a schematic diagram of an aircraft wing which may be utilised according to an example.

FIG. 2 is a simplified schematic diagram of a top view of a wing section 200 which may be utilised according to an example. The internal space of the wing section 200 in FIG. 2 comprises a plurality of ribs 210 running the width of the wing section 200 and is segmented into a plurality of cells 220 between the ribs 210 along the span-wise length of the wing section 200. The wing section 200 may comprise one or more wing boxes similar in design to the wing box 100 shown in FIG. 1. Each rib 210 is attached to the skin of the wing box around the perimeter by curing or bonding, for example. Wing sections according to the embodiments described herein may therefore be described as having a cellular structure. Certain cells within the wing section hold jet fuel. Other cells are "dry" cells which hold hydraulic equipment or landing gear for example.

Certain ribs of the plurality of ribs 210 seal off one or more cells of the wing section 200. In the example shown in FIG. 2 the rib 230 is a boundary rib which separates the wing section 200 in to two bays 240A and 240B. The remaining ribs 210 comprise small apertures which may, for example, allow fuel to pass between through the ribs 210 from one rib bay to another. Typically, the apertures in the ribs 210 are of the order of approximately 10 mm. However, in certain examples the apertures may be larger or smaller than this. The apertures may also sometimes be referred to as "mouse holes".

According to certain examples, the methods described herein are used to inspect an aircraft wing between flights. During flight, the fuel bays 240 of the wing section 200 are at least partially full of fuel. Once the aircraft has landed on the ground the aircraft enters a period of inspection and maintenance before another flight. In the examples described herein one or more inspection devices are inserted in to the wing section 200 during this period. For example, in certain cases an inspection device is inserted in to the wing where the wing section 200 joins the main aircraft fuselage. Once the inspection has occurred the aircraft can be refueled for another flight. According to other examples, the methods described herein are used in conjunction with an aircraft wing which is not coupled to an aircraft such as a newly manufactured wing. In examples an inspection device is inserted into the aircraft wing before the wing is attached to the aircraft to perform an initial inspection of the wing box.

Figure 3:
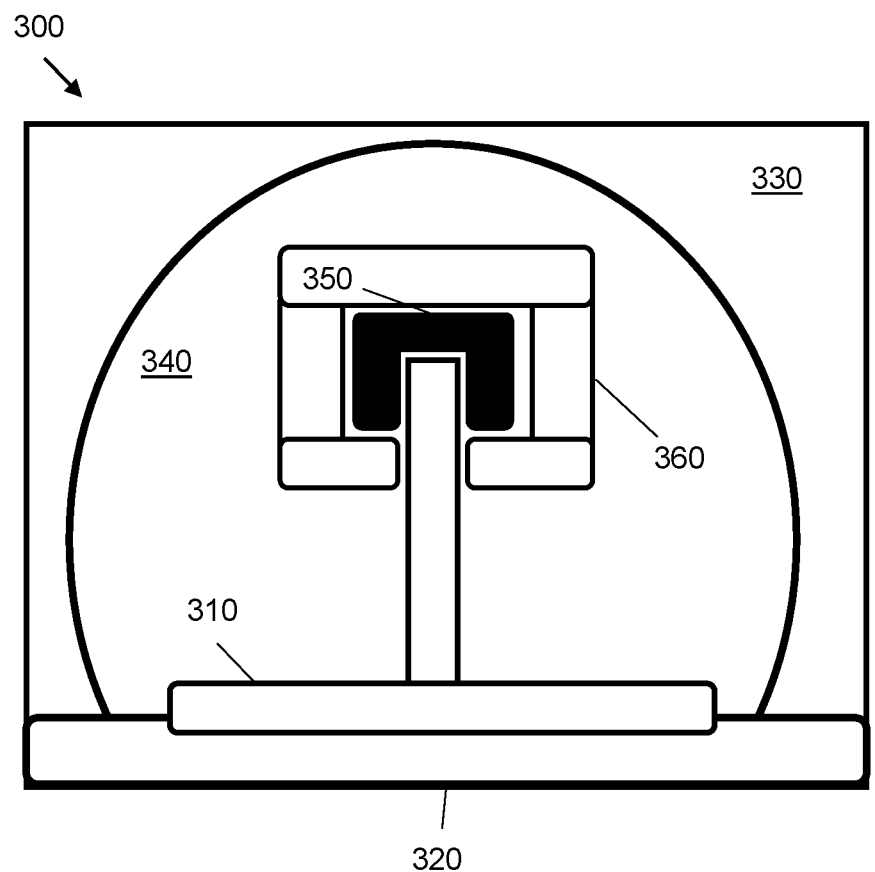
FIG. 3 is a schematic diagram of a cross-section of a wing box of an aircraft wing may be utilised according to an example.

FIG. 3 is a simplified schematic diagram of a cross-sectional view showing a stringer passing through a rib 300 of a wing box which may be utilised according to an example. The view of the rib 300 shown in FIG. 3 may be a cross section of a stringer passing through a rib. In FIG. 3 a stringer 310 is mounted on the inner surface of the wing box on a section 320 of the skin. The stringer 310 passes generally perpendicularly through a portion of the rib. The rib 330 partitions the wing box in to two bays, as shown in FIG. 2. The region 340 is an aperture in the section of the rib 330. The stringer 310 extends through the aperture 340 of the rib 330. In the example shown in FIG. 3 the aperture 340 in the section of the rib 330 is partially circular. Generally, the shape of the aperture 340 follows the shape of the stringer.

In FIG. 3, the shaded region 350 above the stringer 310 is a track 350 that is mounted on top of the stringer 310. In FIG. 3 the stringer 310 is shown attached to the base of the inner surface of the wing box section 320. In other examples, the stringer 310 is mounted on the top of the inner surface of the wing box section 320. The track 350 runs along the length of the stringer through the rib 300. The track 350 provides a surface on to which is provided an inspection device 360. The inspection device 360 is movable along the track 350. In certain cases, the inspection device 360 is arranged to move on the track 350 on wheels which make contact with the track 350. The inspection device 360 is shaped and configured so that it can be controlled to pass along the stringer and through the aperture 340 in the rib 330. The inspection device 360 shown in FIG. 3 partially surrounds both sides of the track 350. However, this particular arrangement is illustrative of possible track and inspection device configurations. For example, in certain cases the inspection device 360 is only arranged to travel on the track 350 along one side or on top of the stringer 310. The track 350 may be modified appropriately for the kind of inspection device 360 that is to be mounted to it. In certain examples, tracks are not required.

Although the stringers described herein such as those shown in FIGS. 1 and 3 are "T"-shaped, other stringer shapes are possible. For example, "I" shapes or hat shapes are also known in aircraft designs and may be applied in examples herein.

The inspection device 360 may be any device suitable for performing inspection of the interior of the aircraft, which is configured and arranged to travel along a stringer and which is suitably dimensioned to pass through the apertures 340 of the wing box through which the stringer passes. According to examples described herein, the inspection device 360 may comprise one or more cameras, sensors, lights, LEDs and other photoelectric equipment. In certain cases, the inspection device 360 comprises one or more components that use, for example, infrared, ultrasound or X-ray to perform inspection of the wing box.

According to an example, the inspection device 360 may be inserted through a man hole in the wing section.

According to certain examples described herein the inspection device 360 is connected to a tether (not shown in FIG. 3). The tether may be used to aid the recovery of the inspection device 360 from within the wing box.

Figure 4:
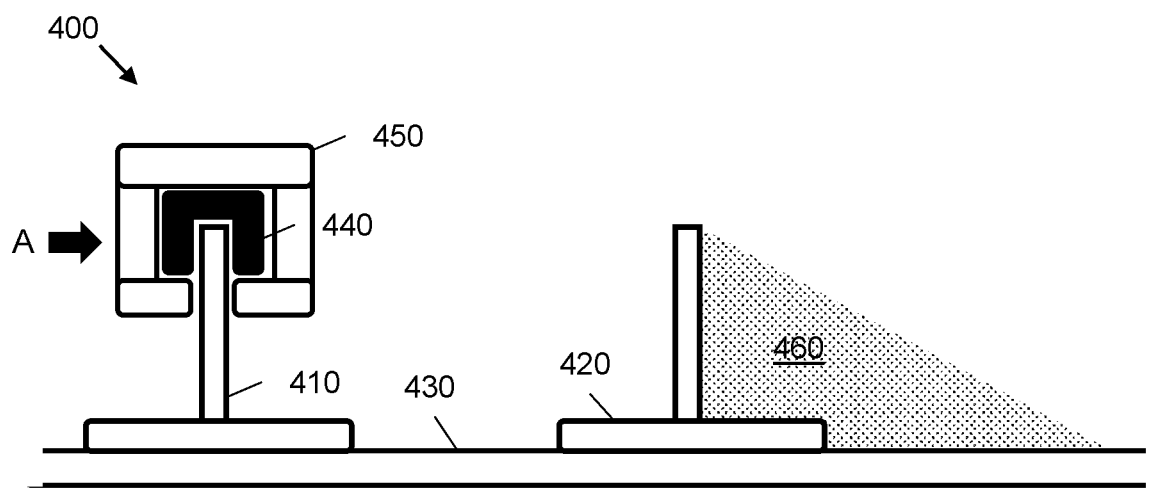
FIG. 4 is a schematic diagram of a cross-section of a wing box which may be utilised according to an example.

FIG. 4 is a simplified schematic diagram of a cross-sectional view of a wing box 400 according to an example. The view of the wing box 400 shown in FIG. 4 is, for example, a portion of the wing box 100 shown in FIG. 1. In FIG. 4 two stringers 410 and 420 are shown. The stringers 410 and 420 are mounted on the inner surface 430 of the wing box 400. The stringer 410 shown FIG. 4 comprises a track 440 that is mounted on to the stringer 410. The track 440 runs the length of the stringer 410 similarly to the track 350 shown in FIG. 3, passing through apertures of the ribs in the wing box 400. An inspection device 450 similar to inspection device 360 is mounted on top of the track 440.

FIG. 4 shows a darkened region 460 on one side of the stringer 420. The region 460 is obscured from the inspection device 450 when the inspection device is mounted on the track 440. A track 470 similar to track 440 is mounted on the stringer 420 in the wing box, such that the inspection device 450, or a similar inspection device may be mounted on the stringer. Mounting an inspection device on different stringers minimizes regions like the region 460 which are not visible to the inspection device 450.

Figure 5:
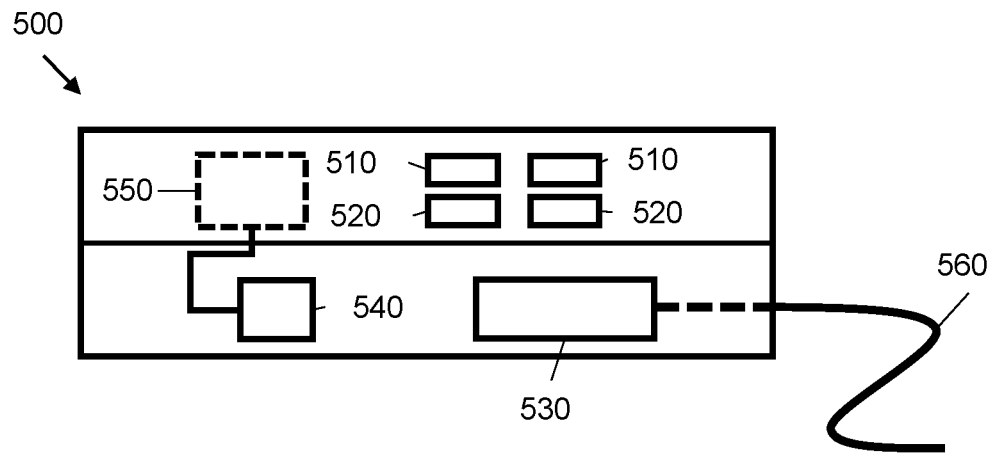
FIG. 5 is a schematic diagram of an inspection device which may be utilised according to an example.

FIG. 5 is a simplified schematic diagram of an inspection device 500 according to an example. According to examples described herein, the inspection device 500 is used in conjunction with the examples of wing boxes and stringers described previously in relation to FIGS. 1-4. The view of the inspection device 500 shown in FIG. 5 is a side-on view as viewed from the direction indicated by the arrow labelled "A" in FIG. 4. Inspection devices such as inspection device 500 that are used in conjunction with examples of wing boxes described herein comprise one or more components for inspecting the wing box. These components are distributed lengthwise along the inspection device 500. This ensures that the design of the inspection device 500 is such that it fits through the apertures in the ribs of the wing box.

The inspection device 500 comprises a pair of cameras 510 and a pair of lights 520. An example of the cameras 510 suitable for the purpose of performing a wing box inspection are those found in mobile telephone devices as these are small and particularly slender cameras hence dimensioned such that the inspection device 500 can pass through the aperture. In particular, any small flat cameras may be used in the inspection device 500 if they are dimensioned appropriately to fit through apertures in the wing box ribs.

The inspection device 500 further comprises a control unit 530. The control unit 530 is responsible for controlling one or more functions of the inspection device 500. In the example shown in FIG. 5, the control unit 530 is electrically coupled to the cameras 510 and lights 520. The control unit 530 is arranged to control the operation of the cameras 510 and lights 520.

The inspection device 500 further comprises a motor 540 which controls the motion of the inspection device 500 along a track on a stringer such as those shown in FIGS. 3 and 4. The motor 540 is arranged to control a wheel 550 which makes contact with the track on the stringer on which the inspection device 500 is mounted. The operation of the motor 510 is controlled by the control unit 530. The inspection device 500 is illustrative of an inspection device that may be used in the context of the methods and systems described herein. Other types of inspection devices may include other components which assist in the inspection of the wing box. For example, some inspection devices comprise an on-board computer including a processor and memory. Other inspection devices comprise further robotic elements such as robotic inspection arms or similar.

In FIG. 5 the inspection device 500 is coupled to a tether 560. According to examples described herein the tether 560 is used to recover the inspection device 500 from within the wing box. In certain cases, the tether 560 is a cable which connects to, for example, an external power supply outside of the wing box that powers the inspection device 500. In this case the inspection device 500 does not necessarily require its own power supply. In particular, the device does not require a battery. This is useful since there the number of inspections that may be carried out with the device increases. Moreover, the inspection device 500 does not need to be removed from the wing box to replace a battery.

In certain examples described herein the tether 560 comprises one or more cables which allow signals such as control or data signals to be sent to and from the inspection device 500, for example fibre optics cables. The operation of the cameras 510 and lights 520 and the motion of the inspection device on the track can be carried out from a remote computer (not shown in FIG. 5) operated by maintenance personnel. According to examples described herein, the inspection device 500 is arranged to gather images of the inside of the wing box of the aircraft, in which the inspection device 500 is inserted, using the cameras 510. The inspection device 500 is arranged to feedback image data, possibly in real-time, to the computer such that an inspection of the wing box can be performed. In certain cases, image data is stored in, for example, a hard drive on the external computer. The data is accessible to maintenance personnel inspecting the aircraft. Maintenance personnel may access image data from previous inspections and compare the image data to image data from the cameras 510 from the most recent inspection to identify changes inside the wing box.

According to certain examples described herein the inspection device 500 may be autonomous or at least partially autonomous to perform one or more operations. For example, the inspection device 500 may be programmable to travel along a stringer, and through an aperture of a rib, take photos of the inside of a section of the wing box, and then return through the aperture to a previous location. In another case the inspection device may be arranged to autonomously gather, for example, image data for a certain time period, and then return to a position where it is recoverable by maintenance personnel e.g. at a manhole in the wing box. In one example, data from an initial inspection is collected and stored. Data collected from future inspections may then be compared to the baseline data collected from the initial inspection.

Figure 6:
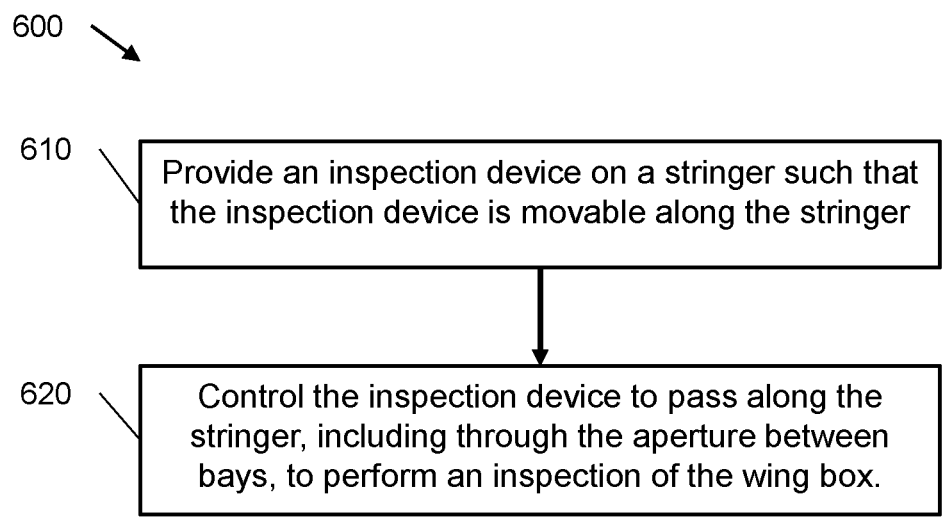
FIG. 6 is a flow diagram showing a method of performing an inspection of a wing box of an aircraft wing according to an example.

FIG. 6 is a flow diagram of a method 600 of performing an inspection of a wing box of an aircraft. The method 600 may be implemented in conjunction with the inspection device 500 shown in FIG. 5 and aircraft wing boxes shown in FIGS. 1 to 4. The method 600 is used to collect, for example, images of the inside of a wing box on an aircraft using an inspection device mounted on a stringer.

The method 600 is a method of inspecting a wing box of an aircraft, for example when the aircraft is located on the ground for maintenance or before the wing is attached to an aircraft. The wing box of the aircraft is assumed to comprise at least one rib partitioning the wing box in to two bays and at least one stringer attached along an inner surface of the wing box, generally perpendicular to the rib, and extending through an aperture of the rib similar to the arrangement of a rib and stringer shown in FIG. 3.

At block 610 an inspection device is provided on a stringer such that the inspection device is moveable on the stringer. According to examples described herein, providing an inspection devices comprises mounting an inspection device on the stringer. In certain cases, this further comprises mounting the inspection device on a track attached to the stringer, as shown in the example of the inspection device 360 mounted on the stringer 310.

At block 620 the inspection device is controlled to pass along the stringer, including through the aperture between bays, to perform an inspection of the wing box. When the inspection device 500 shown in FIG. 5 is used to implement the method 600 control of the inspection device is provided through the control unit 530 that implements block 620.

The methods described herein provide a means of inspecting a wing box of an aircraft comprising ribs and stringers, where the stringers pass through apertures in the ribs and obstruct the wing box from inspection. In particular, the methods described herein may be implemented in any aircraft wing box where the apertures through which the stringers pass are dimensioned such that an inspection device may pass through the apertures and in which the inspection device may be provided on the stringer. The inspection device is controlled to pass through the ribs in the wing box between respective bays of the aircraft wing without maintenance personnel having to access each of the separate bays to carry out the inspection.

The inspection methods described herein decrease the maintenance cost for airlines, since the time spent per maintenance round of the aircraft is reduced. Moreover, the aircraft can be constructed, at least for an initial period, without so-called "manhole covers" which increase the weight of the aircraft, since according to certain examples described herein, the inspection device is recoverable using a tether that attaches to the inspection device. Furthermore, the method reduces the amount of internal tank damage, since maintenance personnel do not need to access the fuel bays. This prolongs the lifetime of the wing box. Moreover, using this method improves efficiency of the manufacturing of the aircraft since manholes do not have to be cut into the wing at the manufacturing stage.

Figure 7:
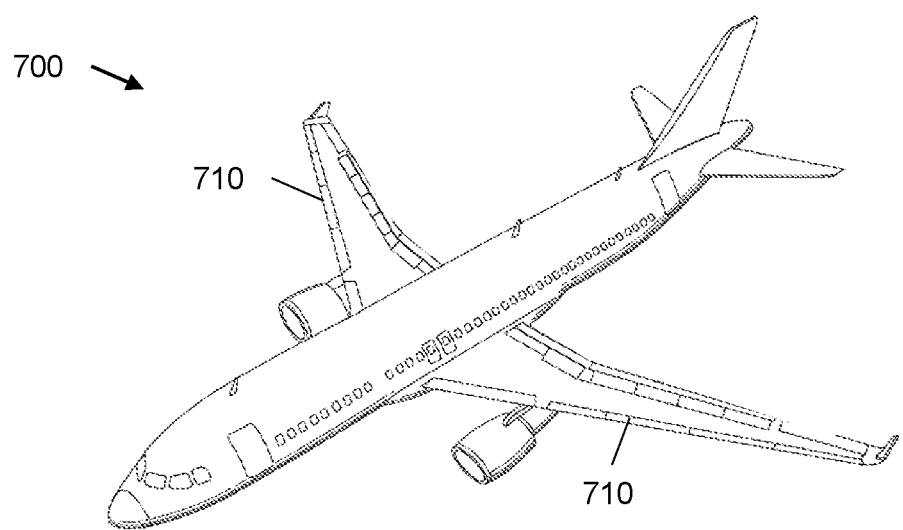
FIG. 7 is a schematic view of an aircraft.

FIG. 7 shows a schematic side view of an example of a vehicle according to an embodiment. In the example of FIG. 7, the vehicle is an aircraft 700. The aircraft 700 comprises wing section 710. Each wing section 710 comprises at least one wing box. The method 600 described herein may be implemented in the context of the aircraft 700 shown in Figure.

Although the invention has been described above with reference to one or more preferred embodiments, it will be appreciated that various changes or modifications may be made without departing from the scope of the invention as defined in the appended claims.

The invention claimed is:

1. A method of inspecting a wing box of an aircraft, the wing box comprising at least one rib partitioning the wing box into two bays and at least one stringer attached along an inner surface of the wing box and extending through an aperture of the rib, wherein the stringer includes a crown spaced from the inner surface, the method comprising:

mounting an inspection device on the crown of the stringer such that the inspection device engages the crown and is movable along the stringer, wherein the inspection device is supported entirely by the crown and a gap is between the inspection device and the inner surface of the wing box as the inspection devices moves along the stringer; and controlling the inspection device to move along the crown of stringer, including moving through the aperture between the two bays, to perform an inspection of a region within the wing box beyond the stringer.

2. The method according to claim 1, wherein the coupling of the inspection device to the stringer comprises coupling the inspection device to a track, wherein the track is attached to the crown of the stringer, and the inspection device is moveable along the track.

3. The method according to claim 1, further comprising:
passing the inspection device through a manhole in the wing box;
the mounting of the inspection device to the stringer is performed after the passage of the inspection device through the manhole;
causing the inspection device to travel through the aperture in one direction;
causing the inspection device to travel through the aperture in an opposite direction, and
after causing the inspection device to travel in the opposite direction, recovering the inspection device from the manhole.

4. The method according to claim 1, further comprising:
passing the inspection device through a first manhole in the wing box;
after the passage of the inspection device through the first manhole, mounting of the inspection device to the crown of the stringer, wherein the inspection device is supported by the crown of the stringer;
causing the inspection device to travel through the aperture in one direction; and
recovering the device by passing the inspection device through a second manhole in the wing box, wherein the rib is between the first and second manholes.

5. The method according to claim 1, wherein the step of controlling the inspection device to move the inspection devices includes using a tether attached to the inspection device to push or pull the inspection device along the stringer.

6. The method according to claim 1, wherein the inspection device is at least partially autonomous.

7. The method according to claim 6, wherein the step of controlling the inspection device includes autonomously moving the inspection device along the stringer.

8. The method according to claim 1, wherein the inspection device is at least partially remotely controllable and the controlling step is performed at least partially by remotely controlling the inspection device.

9. The method according to claim 8, wherein the step of controlling the inspection device is performed remotely and includes controlling the inspection device from outside of the wing box.

10. The method according to claim 1, further comprising receiving data from the inspection device during the controlling step.

11. The method according to claim 1, further comprising storing and/or analyzing data received from the inspection device during the controlling step.

12. The method according to claim 1, wherein the stringer is a first stringer and the inspection of the wing box further comprises mounting the inspection device on at least one other stringer in the wing box, and controlling the inspection device to move along the at least one other stringer, to perform an inspection of a region of the wing box visible to the inspection device from the at least one other stringer but not visible to the inspection device from the first stringer.

13. The method according to claim 1, wherein the two bays of the wing box comprise a first bay and a second bay separated by the rib, and wherein the inspection of the wing box further comprises:
providing the inspection device on a stringer in the second bay such that the inspection device is movable along the stringer of the second bay; and
controlling the inspection device to move along the stringer of the second bay to perform an inspection of an interior region of the second bay of the wing box beyond the stringer of the second bay.

14. The method according to claim 1, further comprising preforming two or more inspections of the wing box and comparing data received from the inspection device during at least one of the inspections with data received from a most recent one of the inspections.

15. The method according to claim 1, wherein the inspection device includes a camera, borescope, laser scanner and/or an X-ray device which face outward of the inspection device and away from the stringer, and the method further comprises using the camera, the borescope, the laser scanner and/or the X-ray device to inspect the interior region of the wing box during the controlling step.

16. The method according to claim 1, further comprising retrieving the inspection device through a manhole in the wing box.

17. A method to inspect a wing box of an aircraft, wherein the wing box includes a skin, a rib supporting the skin and partitioning the wing box into bays, and a stringer attached to an inner surface of the skin and extending through an opening in the rib, the method comprising:
inserting an inspection device through the skin and into one of the bays;
attaching the inspection device to a crown of the stringer such that the inspection device is entirely supported by the stringer, and a gap is between the inspection device and the inner surface of the skin as the inspection device moves along the stringer;
moving the inspection device along the stringer, wherein the movement includes passing the inspection device through the opening in the rib; and
contemporaneously with the movement of the inspection device, inspecting an interior region of the wing box beyond the stringer by using the inspection device to collect information regarding the interior region of the wing box.

18. The method of claim 17 wherein the inspection of the wing box includes inspecting with the inspection device both of the bays of the wing box while the inspection device is attached to the stringer.

* * * * *